(12) United States Patent
Noh et al.

(10) Patent No.: US 9,052,195 B2
(45) Date of Patent: Jun. 9, 2015

(54) INERTIAL SENSOR FOR DETECTING ANGULAR VELOCITY

(75) Inventors: Jung Eun Noh, Gyunggi-do (KR);
Seung Heon Han, Gyunggi-do (KR);
Jong Woon Kim, Gyunggi-do (KR);
Sung Jun Lee, Gyunggi-do (KR); Seung Mo Lim, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 316 days.

(21) Appl. No.: 13/592,096

(22) Filed: Aug. 22, 2012

(65) Prior Publication Data
US 2013/0220015 A1 Aug. 29, 2013

(30) Foreign Application Priority Data
Feb. 27, 2012 (KR) .................. 10-2012-0019870

(51) Int. Cl.
*G01C 19/56* (2012.01)
*G01C 19/5684* (2012.01)

(52) U.S. Cl.
CPC ............ *G01C 19/5684* (2013.01); *G01C 19/56* (2013.01)

(58) Field of Classification Search
USPC ............... 73/504.12, 504.02, 504.04, 504.13, 73/514.34, 514.33
See application file for complete search history.

(56) References Cited

U.S. PATENT DOCUMENTS

| | | | | |
|---|---|---|---|---|
| 5,691,471 A | * | 11/1997 | Okazaki et al. | 73/504.04 |
| 8,661,898 B2 | * | 3/2014 | Watson | 73/504.12 |
| 2009/0019932 A1 | * | 1/2009 | Cardarelli | 73/504.02 |
| 2009/0056443 A1 | * | 3/2009 | Netzer | 73/504.12 |
| 2010/0011857 A1 | * | 1/2010 | Gier et al. | 73/504.12 |
| 2010/0089158 A1 | * | 4/2010 | Watson | 73/504.12 |
| 2011/0146404 A1 | | 6/2011 | Jeung | |

\* cited by examiner

*Primary Examiner* — Helen Kwok
(74) *Attorney, Agent, or Firm* — Ladas & Parry, LLP

(57) ABSTRACT

Disclosed herein is an inertial sensor including: a membrane; first and second driving units provided in a first axis direction (an X axis direction) so as to be symmetrical to each other based on a predetermined point of the membrane to thereby vibrate while being expanded and contracted in the first axis direction; and third and fourth driving units provided in a second axis direction (a Y axis direction) perpendicular to the first axis direction so as to be symmetrical to each other based on a predetermined point of the membrane to thereby vibrate while being expanded and contracted in the second axis direction, wherein the first and second driving units have different vibration frequencies so that they vibrate while being expanded and contracted in the opposite manner and then vibrate while being expanded and contracted in the same manner.

9 Claims, 6 Drawing Sheets

INERTIAL SENSOR FOR DETECTING ANGULAR VELOCITY

CROSS REFERENCE TO RELATED APPLICATION

This application claims the benefit of Korean Patent Application No. 10-2012-0019870, filed on Feb. 27, 2012, entitled "Inertial Sensor", which is hereby incorporated by reference in its entirety into this application.

BACKGROUND OF THE INVENTION

1. Technical Field

The present invention relates to an inertial sensor.

2. Description of the Related Art

Recently, an inertial sensor has been used in various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like.

The inertial sensor generally adopts a configuration in which a mass body is adhered to an elastic substrate such as a membrane, or the like, in order to measure acceleration and angular velocity. Through the above-mentioned configuration, the inertial sensor may calculate the acceleration by measuring inertial force applied to the mass body and may calculate the angular velocity by measuring Coriolis force applied to the mass body.

In detail, a scheme of measuring the acceleration and the angular velocity using the inertial sensor is as follows. First, the acceleration may be calculated by Newton's law of motion "F=ma", where "F" represents inertial force applied to the mass body, "m" represents a mass of the mass body, and "a" is acceleration to be measured. Among others, the acceleration a may be obtained by sensing the inertial force F applied to the mass body and dividing the sensed inertial force F by the mass m of the mass body that is a predetermined value. Further, the angular velocity may be obtained by Coriolis force "F=2mΩ×v", where "F" represents the Coriolis force applied to the mass body, "m" represents the mass of the mass body, "Ω" represents the angular velocity to be measured, and "v" represents the motion velocity of the mass body. Among others, since the motion velocity V of the mass body and the mass m of the mass body are values known in advance, the angular velocity Ω may be obtained by detecting the Coriolis force (F) applied to the mass body.

Meanwhile, the inertial sensor according to the prior art includes a piezoelectric material disposed on a membrane (a diaphragm) in order to sense driving a mass body or displacement of the mass body, as disclosed in Patent Document of the following Prior Art Document. In this configuration, in order to measure angular velocity (Ω) in a three-axis (X, Y, and Z axes) direction, the mass body should vibrate in at least two-axis (for example, X and Z axes) direction. Therefore, in the inertial sensor according to the prior art, the mass body is vibrated in the X direction, forcibly stopped, and then vibrated in the Z axis direction, through time division. However, in the inertial sensor according to the prior art, when the mass body is forcibly stopped and then vibrated in the Z axis, crosstalk is generated in the X axis, such that it is difficult to accurately measure the angular velocity (Ω).

In order to solve this problem, a method of measuring angular velocity (Ω) by including two inertial sensors, that is, one inertial sensor vibrating a mass body in an X axis direction and the other inertial sensor vibrating the mass body in a Z axis direction may be considered. However, in the case in which two inertial sensors are included, a manufacturing process is complicated, and a manufacturing cost is excessively increased.

PRIOR ART DOCUMENT

Patent Document (Patent Document 1) US20110146404 A1

SUMMARY OF THE INVENTION

The present invention has been made in an effort to provide an inertial sensor capable of preventing crosstalk from being generated even though a mass body is vibrated in a first axis direction (an X axis direction) and then vibrated in a second axis direction (a Z axis direction) in order to measure angular velocity (Ω).

According to a preferred embodiment of the present invention, there is provided an inertial sensor including: a membrane; first and second driving units provided in a first axis direction so as to be symmetrical to each other based on a predetermined point of the membrane to thereby vibrate while being expanded and contracted in the first axis direction; and third and fourth driving units provided in a second axis direction perpendicular to the first axis direction so as to be symmetrical to each other based on a predetermined point of the membrane to thereby vibrate while being expanded and contracted in the second axis direction, wherein the first and second driving units have different vibration frequencies so that they vibrate while being expanded and contracted in the opposite manner and then vibrate while being expanded and contracted in the same manner.

When the first and second driving units vibrate while being expanded and contracted in the opposite manner, the third and fourth driving units may stop, and when the first and second driving units vibrate while being expanded and contracted in the same manner, the third and fourth driving units may vibrate while being expanded and contracted in the same manner as that of the first and second driving units.

The inertial sensor may further include a mass body provided on the membrane, wherein when the first and second driving units vibrate while being expanded and contracted in the opposite manner and the third and fourth driving units stop, the mass body vibrates in the first axis direction.

The inertial sensor may further include a mass body provided on the membrane, wherein when the first and second driving units vibrate while being expanded and contracted in the same manner and the third and fourth driving units vibrate while being expanded and contracted in the same manner as that of the first and second driving units, the mass body vibrates in a third axis direction perpendicular to both of the first and second axis directions.

When the mass body vibrates in the first axis direction, Coriolis force in the second axis direction may be sensed to measure angular velocity at which the mass body rotates based on a third axis direction perpendicular to both of the first and second axis directions or Coriolis force in the third axis direction may be sensed to measure angular velocity at which the mass body rotates based on the second axis direction.

When the mass body vibrates in the third axis direction, Coriolis force in the first axis direction may be sensed to measure angular velocity at which the mass body rotates based on the second axis direction or Coriolis force in the second axis direction may be sensed to measure angular velocity at which the mass body rotates based on the first axis direction.

During a process in which the first and second driving units vibrate while being expanded and contracted in the opposite manner and then vibrate while being expanded and contracted in the same manner, the first and second driving units may continuously vibrate.

Each of the first to fourth driving units may be formed of a piezoelectric material.

The inertial sensor may further include: a mass body provided at a lower portion of a central portion of the membrane; and a post provided at a lower portion of an edge of the membrane.

A process in which the first and second driving units vibrate while being expanded and contracted in the opposite manner and then vibrate while being expanded and contracted in the same manner may be repeated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
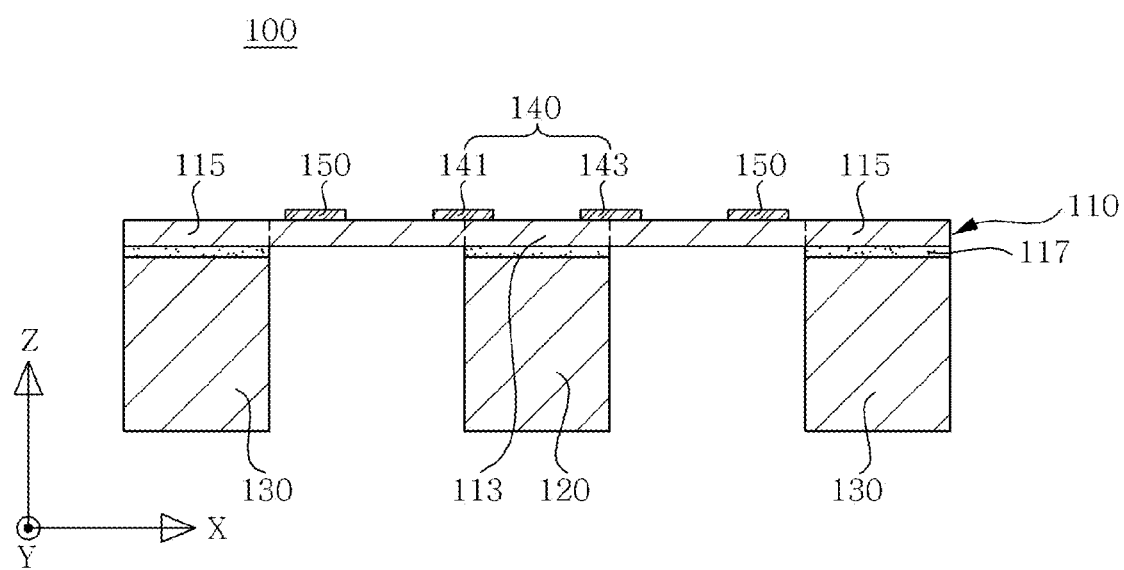
FIG. 1 is a cross-sectional view of an inertial sensor according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 2:
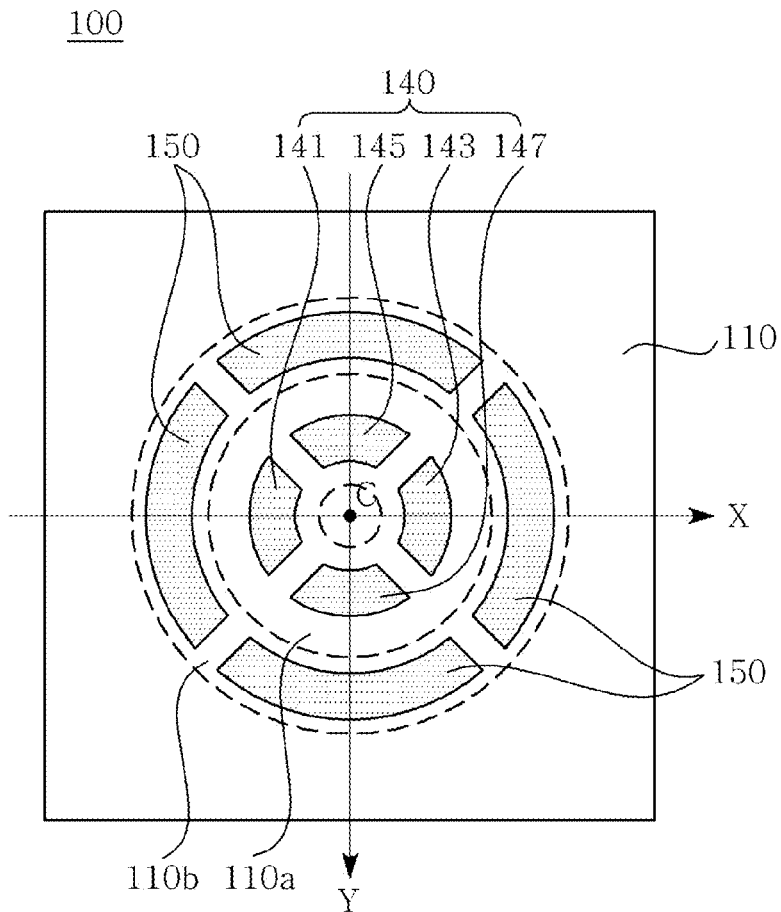
FIG. 2 is a plan view of the inertial sensor shown in FIG. 1.

FIG. 1 is a cross-sectional view of an inertial sensor according to a preferred embodiment of the present invention; and FIG. 2 is a plan view of the inertial sensor shown in FIG. 1.

As shown in FIGS. 1 and 2, the inertial sensor 100 according to the present embodiment is configured to include a membrane 110; first and second driving units 141 and 143 provided in a first axis direction (an X axis direction) so as to be symmetrical to each other based on a predetermined point C of the membrane 110 to thereby vibrate while being expanded and contracted in the first axis direction (the X axis direction); and third and fourth driving units 145 and 147 provided in a second axis direction (a Y axis direction) perpendicular to the first axis direction (the X axis direction) so as to be symmetrical to each other based on a predetermined point C of the membrane 110 to thereby vibrate while being expanded and contracted in the second axis direction (the Y axis direction), wherein the first and second driving units 141 and 143 have different vibration frequencies so that they vibrate while being expanded and contracted in the opposite manner and then vibrate while being expanded and contracted in the same manner.

The membrane 110 is formed in a plate shape and has elasticity so that a mass body 120 provided thereon may be displaced. Here, a boundary of the membrane 110 is not accurately partitioned, but may be partitioned into a central portion 113 of the membrane 110 and an edge 115 provided along the outside of the membrane 110. In this case, a lower portion of the central portion 113 of the membrane 110 may be provided with the mass body 120, and a lower portion of the edge 115 of the membrane 110 is provided with a post 130. Therefore, the edge 115 of the membrane 110 is fixed by being supported by the post 130, and displacement corresponding to the movement of the mass body 120 is generated at the central portion 113 of the membrane 110 based on the fixed edge 115 of the membrane 110.

More specifically, describing the mass body 120 and the post 130, the mass body 120 is provided under the central portion 113 of the membrane 110 to thereby be displaced by inertial force or Coriolis force. In addition, the post 130 is formed in a hollow shape and supports the lower portion of the edge 115 of the membrane 110 to thereby serve to secure a space in which the mass body 120 may be displaced. Here, the mass body 120 may be formed in, for example, a cylindrical shape, and the post 130 may be formed in a square pillar shape in which a cavity having a cylindrical shape is formed at a center thereof. That is, when being viewed based on a transverse section, the mass body 120 is formed in a circular shape, and the post 130 is formed in a square shape in which a circular opening is provided at the center thereof. However, the mass body 120 and the post 130 are not limited to having the above-mentioned shapes, but may have all shapes known in the art.

Meanwhile, the membrane 110, the mass body 120, and the post 130 described above may be formed by selectively etching a silicon on insulator (SOI) substrate on which a micro electro mechanical systems process is easily performed. Therefore, a silicon oxide layer ($SiO_2$) 117 of the SOI substrate may remain between the mass body 120 and the membrane 110 and between the post 130 and the membrane 110. However, the membrane 110, the mass body 120, and the post 130 are not necessarily formed by etching the SOI substrate, but may also be formed by etching a general silicon substrate, or the like.

The driving unit 140, which includes the first and second driving units 141 and 143 and the third and fourth driving units 145 and 147 (See FIG. 2), serves to vibrate the mass body 120 provided on the membrane 110. Here, the first and second driving units 141 and 143 are provided in the X axis direction so as to be symmetrical to each other based on the predetermined point C of the membrane 110 (for example, the center of the membrane 110) to thereby vibrate in the X axis direction. In addition, the third and fourth driving units 145 and 147 are provided in the Y axis direction (a direction perpendicular to the X axis direction) so as to be symmetrical to each other based on the predetermined point C of the membrane 110 to thereby vibrate in the Y axis direction.

Further, in addition to the above-mentioned driving unit 140, a sensing unit 150 sensing displacement of the mass body 120 may be provided. Here, each of the driving unit 140 and the sensing unit 150 may be formed in an arc shape. For example, when the membrane 110 is divided into an inner annular region 110a enclosing the predetermined point C and an outer annular region 110b enclosing the inner annular region 110a, the inner annular region 110a may be provided with the driving unit 140 having four divided arc shapes, and the outer annular region 110b may be provided with the sensing unit 150 having four divided arc shapes. However, positions of the driving unit 140 and the sensing unit 150 may be mutually changed. For example, the driving unit 140 may be formed in the outer annular region 110b, and the sensing unit 150 may be formed in the inner annular region 110a.

Here, the driving unit 140 and the sensing unit 150 may be formed of a piezoelectric material such as lead zirconate titanate (PZT), barium titanate ($BaTiO_3$), lead titanate (Pb-$TiO_3$), lithium niobate ($LiNbO_3$), silicon dioxide ($SiO_2$), or the like. As described above, in the case in which the driving unit 140 and the sensing unit 150 are formed of the piezoelectric material, the mass body 120 may be vibrated using an inverse piezoelectric effect in which the piezoelectric material is expanded and contracted when voltage is applied to the piezoelectric material (in the case of the driving unit 140) or the displacement of the mass body 120 may be sensed using a piezoelectric effect in which voltage is generated when stress is applied to the piezoelectric material (in the case of the sensing unit 150).

Figure 3A:
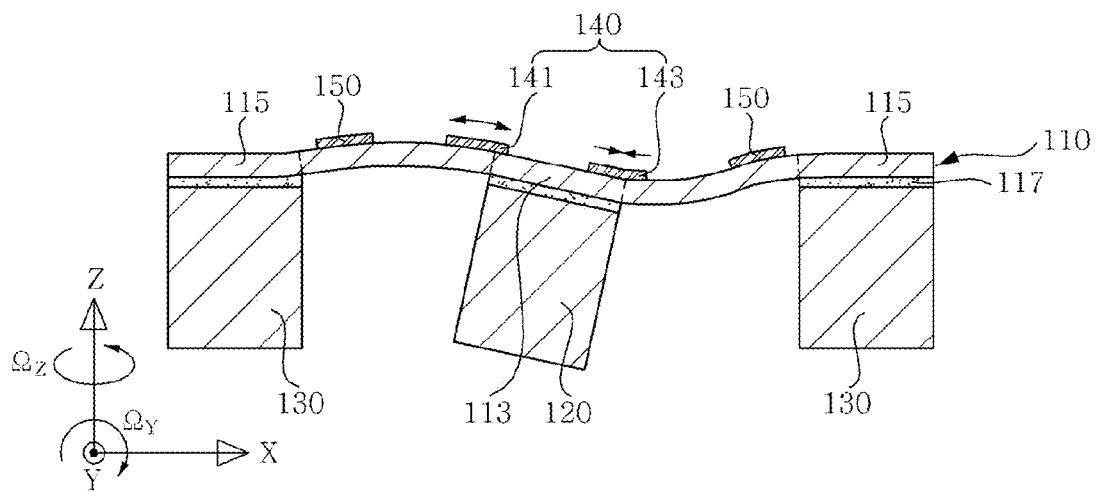
FIGS. 3A and 3B are cross-sectional views showing a process of vibrating a mass body shown in FIG. 1 in an X axis direction.
Figure 3B:
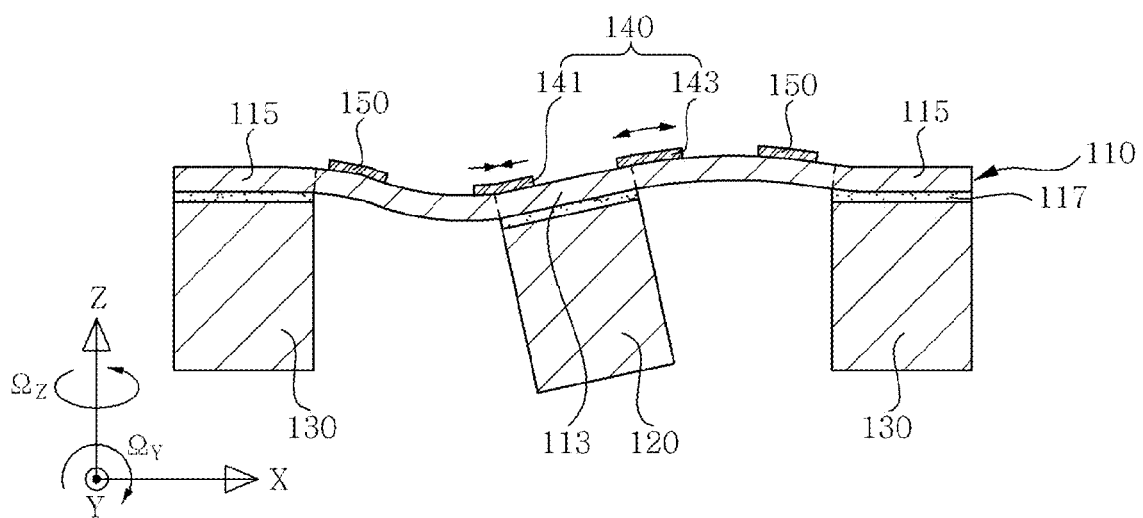
Figure 4A:
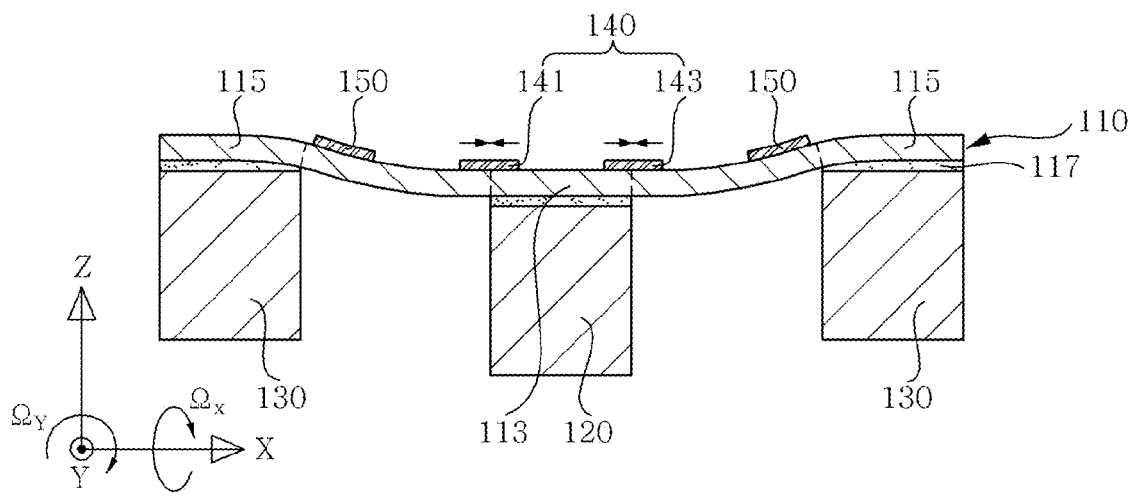
FIGS. 4A and 4B are cross-sectional views showing a process of vibrating the mass body shown in FIG. 1 in a Z axis direction.
Figure 4A:
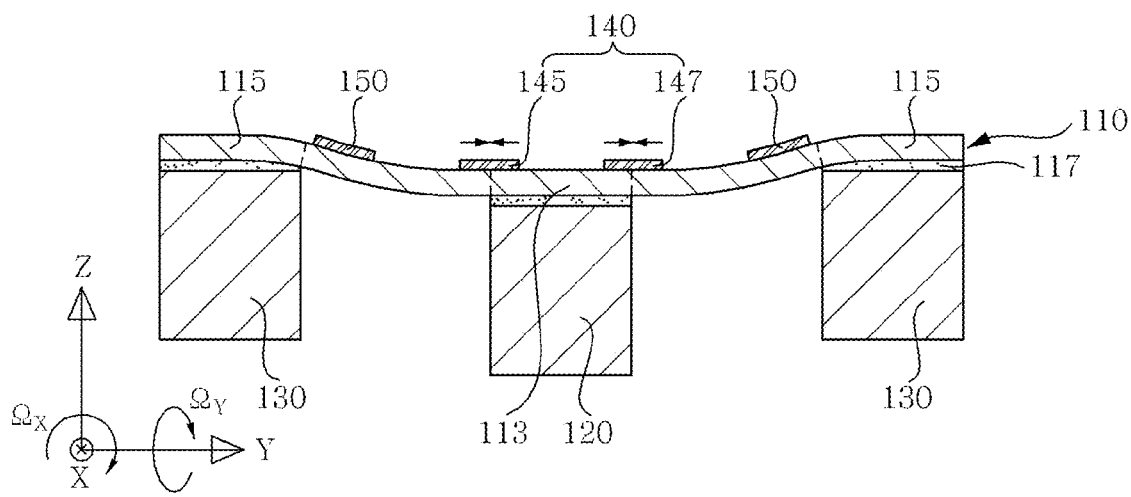
Figure 4B:
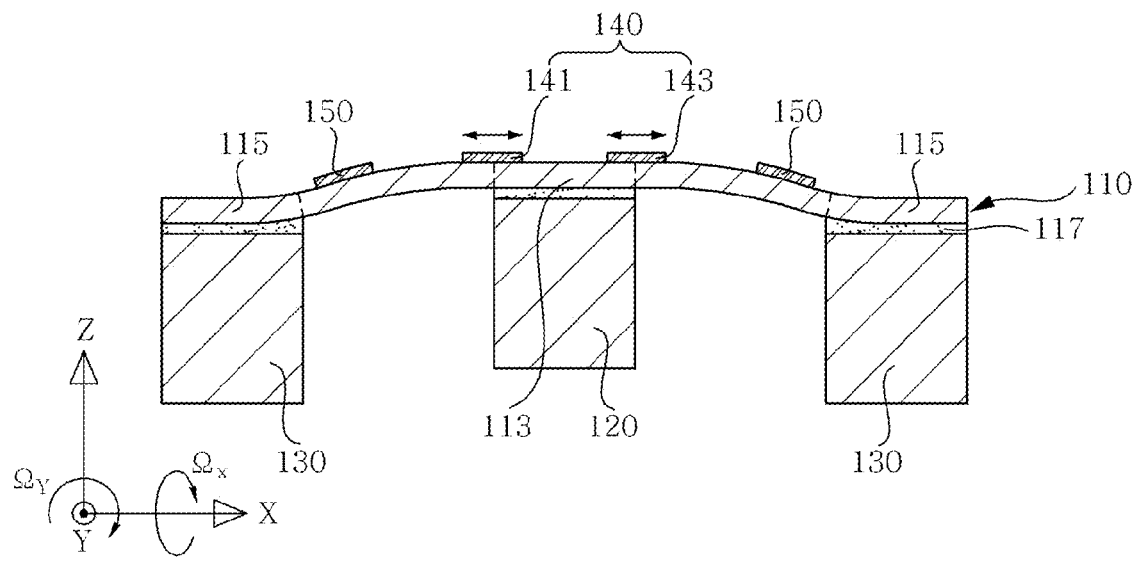
Figure 4B:
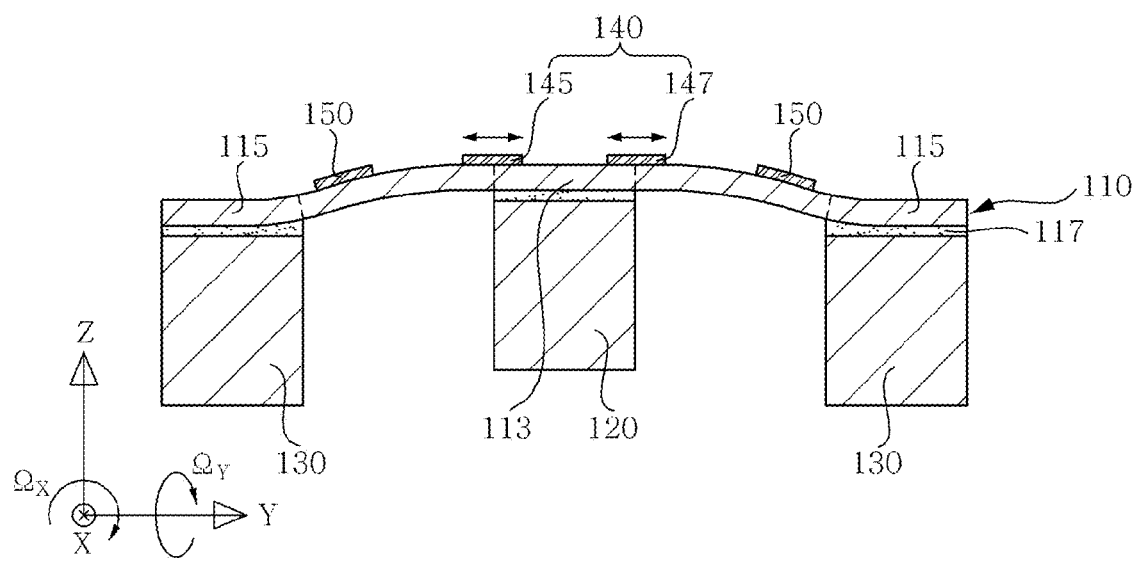

FIGS. 3A and 3B are cross-sectional views showing a process of vibrating a mass body shown in FIG. 1 in an X axis direction; and FIGS. 4A and 4B are cross-sectional views showing a process of vibrating the mass body shown in FIG. 1 in a Z axis direction.

A process in which the driving unit 140 is expanded and contracted to vibrate the mass body 120 provided on the membrane 110, thereby generating Coriolis force, and the sensing unit 150 senses the Coriolis force to measure angular velocity will be described with reference to FIGS. 3A to 4B.

More specifically, as shown in FIGS. 3A and 3B, when the mass body 120 is vibrated in the X axis direction by the first and second driving units 141 and 143, Coriolis force in the Y axis direction is sensed by the sensing unit 150, thereby making it possible to measure angular velocity $\Omega_Z$ at which the mass body 120 rotates based on the Z axis direction. Alternatively, Coriolis force in the Z axis direction is sensed by the sensing unit 150, thereby making it possible to measure angular velocity $\Omega_Y$ at which the mass body 120 rotates based on the Y axis direction.

Meanwhile, as shown in FIGS. 4A and 4B, when the mass body 120 is vibrated in the Z axis direction by the first and second driving units 141 and 143 and the third and fourth driving units 145 and 147, Coriolis force in the X axis direction is sensed by the sensing unit 150, thereby making it possible to measure angular velocity $\Omega_Y$ at which the mass body 120 rotates based on the Y axis direction. Alternatively, Coriolis force in the Y axis direction is sensed by the sensing unit 150, thereby making it possible to measure angular velocity $\Omega_X$ at which the mass body 120 rotates based on the X axis direction.

As described above, in order to measure the angular velocity in the X, Y, and Z directions, the mass body 120 needs to be vibrated in the X axis direction and the Z axis direction. Therefore, a process of vibrating the mass body 120 using the first and second driving units 141 and 143 and the third and fourth driving units 145 and 147 will be described in detail.

Figure 5:
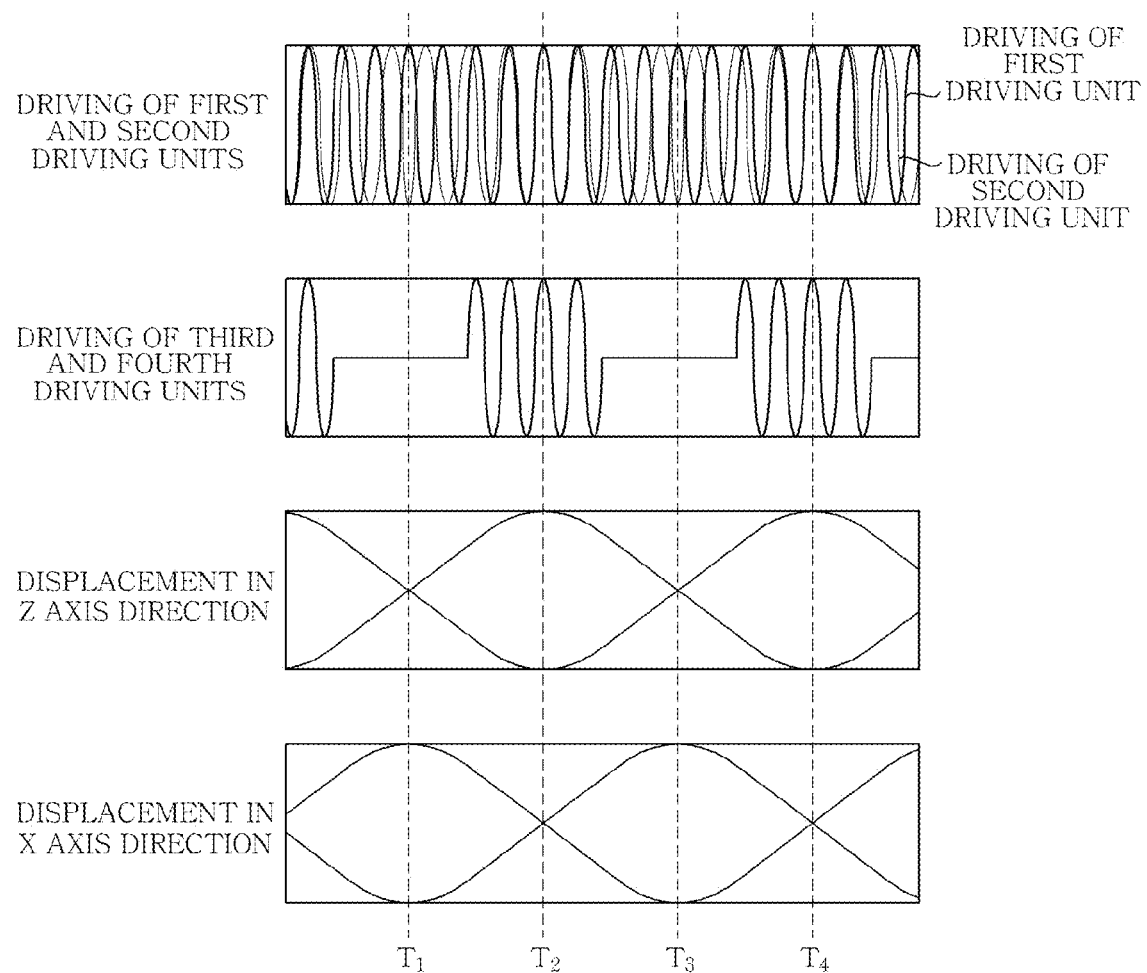
FIG. 5 is a graph showing driving of the inertial sensor shown in FIG. 1.

FIG. 5 is a graph showing driving of the inertial sensor shown in FIG. 1.

As shown in FIG. 5, since the vibration frequency of the first driving unit 141 is different from that of the second driving unit 143, the first and second driving units 141 and 143 may vibrate while being expanded and contracted in the opposite manner in a first time $T_1$ and then vibrate while being expanded and contracted in the same manner in a second time $T_2$.

More specifically, in the first time $T_1$ in which the first and second driving units 141 and 143 vibrate while being expanded and contracted in the opposite manner, the third and fourth driving units 145 and 147 stop (See FIG. 5). As described above, since the first and second driving units 141 and 143 provided in the X axis direction of the membrane 110 vibrate while being expanded and contracted in the opposite manner (See FIGS. 3A and 3B), the mass body 120 provided on the membrane 110 is displaced in a ±X axis direction to thereby vibrate in the X axis direction.

Meanwhile, in the second time $T_2$ in which the first and second driving units 141 and 143 vibrate while being expanded and contracted in the same manner, the third and fourth driving units 145 and 147 vibrate while being expanded and contracted in the same manner as that of the first and second driving units 141 and 143 (See FIG. 5). As described above, since the first and second driving units 141 and 143 provided in the X axis direction of the membrane 110 vibrate while being expanded and contracted in the same manner and the third and fourth driving units 145 and 147 provided in the Y axis of the membrane 110 vibrate while being expanded and contracted in the same manner as that of the first and second driving units 141 and 143 (See FIGS. 4A and 4B), the mass body 120 provided on the membrane 110 is displaced in a ±Z axis direction to thereby vibrate in the Z axis direction.

As described above, during the process in which the first and second driving units 141 and 143 vibrate while being expanded and contracted in the opposite manner and then vibrate while being expanded and contracted in the same manner, the first and second driving units 141 and 143 are maintained in a state in which they continuously vibrate. Therefore, the inertial sensor 100 may naturally change the vibration of the mass body 120 from the X axis direction into the Z axis direction, such that generation of crosstalk may be prevented.

In addition, since the mass body 120 continuously vibrates during change of the vibration of the mass body 120 from the X axis direction into the Z axis direction, a sampling rate time indicating the maximum amplitude may be reduced.

Meanwhile, a process in which the first and second driving units 141 and 143 vibrate while being expanded and contracted in the opposite manner (the first time $T_1$) and then vibrate while being expanded and contracted in the same manner (the second time $T_2$) may be repeated as shown in third and fourth times $T_3$ and $T_4$ of FIG. 5. As described above, a process in which the mass body 120 is vibrated in the X axis direction and then vibrated in the Z axis direction may be repeated while the process in which the first and second driving units 141 and 143 vibrate while being expanded and contracted in the opposite manner and then vibrate while being expanded and contracted in the same manner is repeated. Therefore, the angular velocity $\Omega$ may be continuously measured.

As set forth above, according to the preferred embodiment of the present invention, since the mass body is forcibly stopped even though the mass body is vibrated in the first axis direction (the X axis direction) and then vibrated in the second axis direction (the Z axis direction) in order to measure the angular velocity (Ω) using the inertial sensor, generation of crosstalk may be prevented.

In addition, according to the preferred embodiment of the present invention, when the mass body is vibrated in the first axis direction (the X axis direction) and then vibrated in the second axis direction (the Z axis direction), the vibration is continued, thereby making it possible to reduce a sampling rate time indicating a maximum amplitude.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An inertial sensor for detecting angular velocity comprising:
   a membrane;
   first and second driving units provided in a first axis direction so as to be symmetrical to each other based on a predetermined point of the membrane to thereby vibrate while being expanded and contracted in the first axis direction; and
   third and fourth driving units provided in a second axis direction perpendicular to the first axis direction so as to be symmetrical to each other based on a predetermined point of the membrane to thereby vibrate while being expanded and contracted in the second axis direction,
   wherein the first and second driving units have different vibration frequencies so that the first and second driving units vibrate while being expanded and contracted in the opposite manner and then vibrate while being expanded and contracted in the same manner, and
   wherein when the first and second driving units vibrate while being expanded and contracted in the opposite manner, the third and fourth driving units stop, and when the first and second driving units vibrate while being expanded and contracted in the same manner, the third and fourth driving units vibrate while being expanded and contracted in the same manner as that of the first and second driving units.

2. The inertial sensor as set forth in claim 1, further comprising a mass body provided on the membrane,
   wherein when the first and second driving units vibrate while being expanded and contracted in the opposite manner and the third and fourth driving units stop, the mass body vibrates in the first axis direction.

3. The inertial sensor as set forth in claim 1, further comprising a mass body provided on the membrane,
   wherein when the first and second driving units vibrate while being expanded and contracted in the same manner and the third and fourth driving units vibrate while being expanded and contracted in the same manner as that of the first and second driving units, the mass body vibrates in a third axis direction perpendicular to both of the first and second axis directions.

4. The inertial sensor as set forth in claim 2, wherein when the mass body vibrates in the first axis direction, Coriolis force in the second axis direction is sensed to measure angular velocity at which the mass body rotates based on a third axis direction perpendicular to both of the first and second axis directions or Coriolis force in the third axis direction is sensed to measure angular velocity at which the mass body rotates based on the second axis direction.

5. The inertial sensor as set forth in claim 3, wherein when the mass body vibrates in the third axis direction, Coriolis force in the first axis direction is sensed to measure angular velocity at which the mass body rotates based on the second axis direction or Coriolis force in the second axis direction is sensed to measure angular velocity at which the mass body rotates based on the first axis direction.

6. The inertial sensor as set forth in claim 1, wherein during a process in which the first and second driving units vibrate while being expanded and contracted in the opposite manner and then vibrate while being expanded and contracted in the same manner, the first and second driving units continuously vibrate.

7. The inertial sensor as set forth in claim 1, wherein each of the first to fourth driving units is formed of a piezoelectric material.

8. The inertial sensor as set forth in claim 1, further comprising:
   a mass body provided at a lower portion of a central portion of the membrane; and
   a post provided at a lower portion of an edge of the membrane.

9. The inertial sensor as set forth in claim 1, wherein a process in which the first and second driving units vibrate while being expanded and contracted in the opposite manner and then vibrate while being expanded and contracted in the same manner is repeated.

* * * * *